Jan. 19, 1965    M. S. LIDDELL ETAL    3,166,272
MIXING MECHANISM
Filed Oct. 28, 1963    3 Sheets-Sheet 1
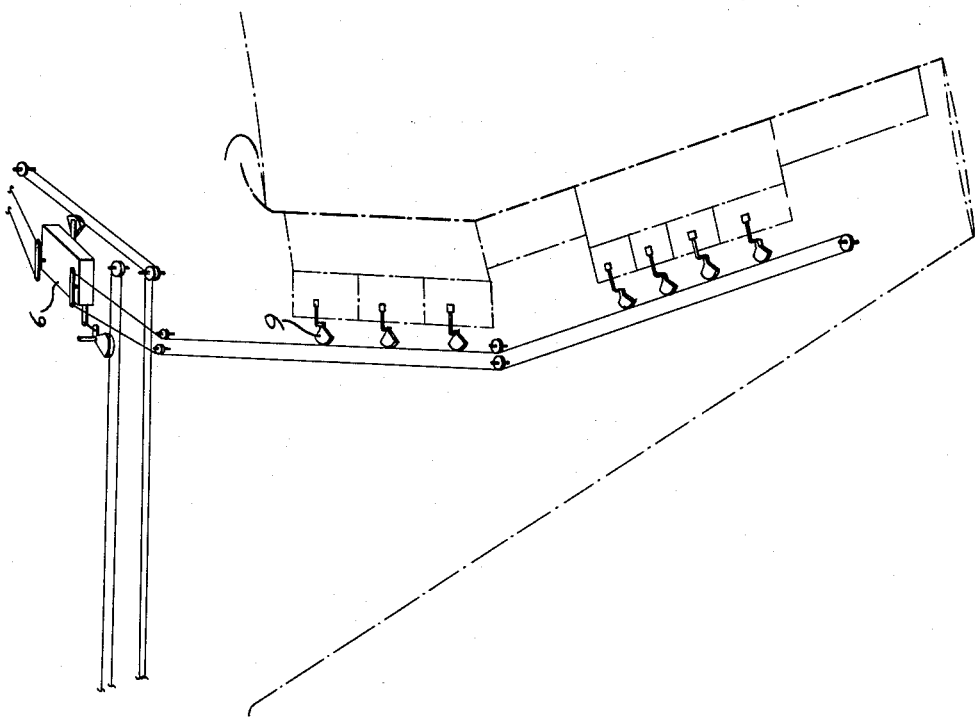
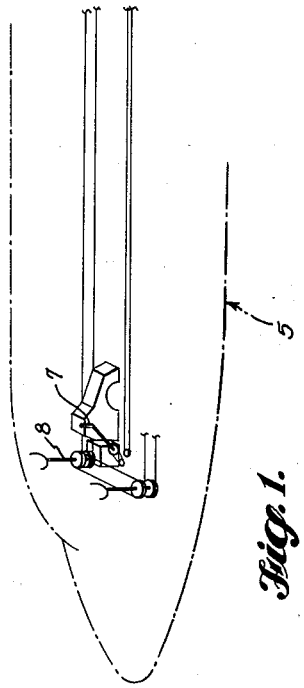
INVENTORS
ROMAN K. WOJCIECHOWSKI
MAURICE S. LIDDELL
LAWRENCE M. THIEN
BY Erwin F. Adams
AGENT

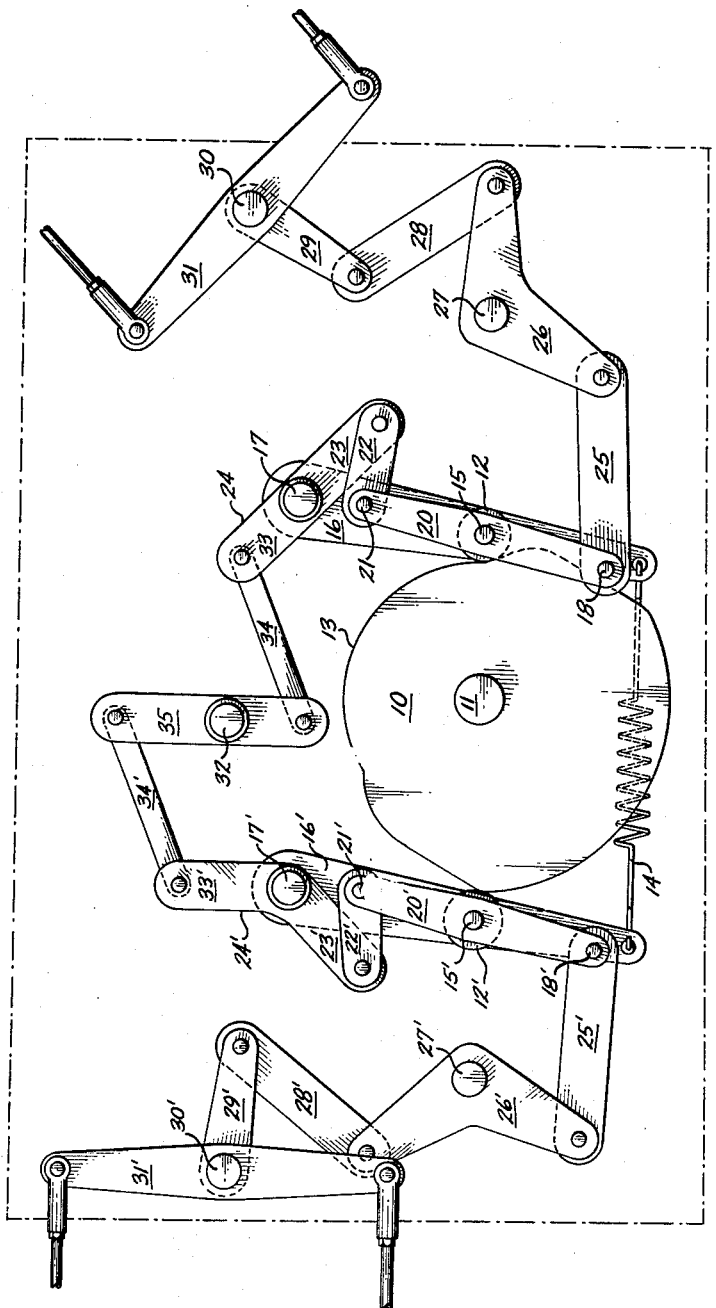

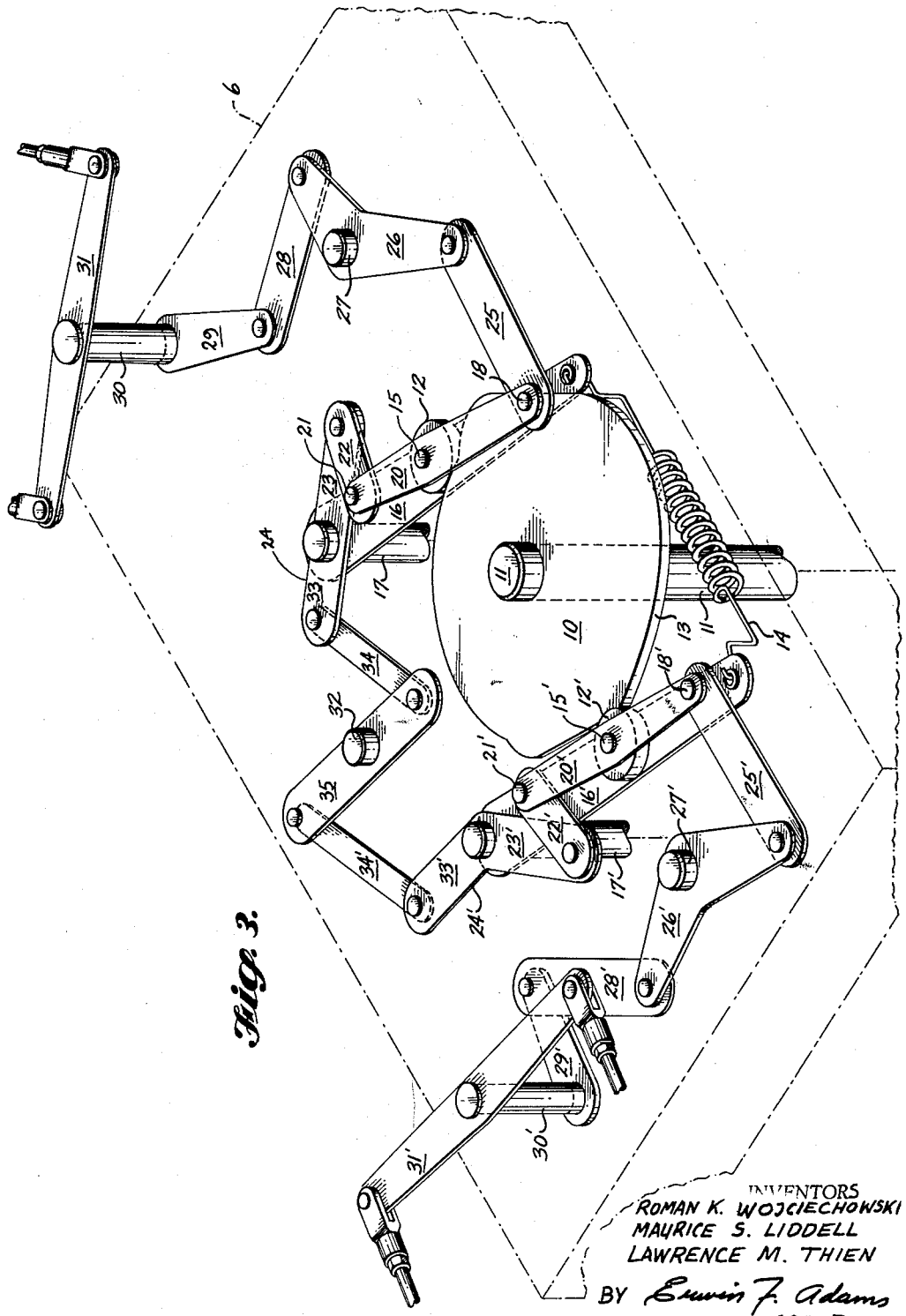

United States Patent Office 3,166,272
Patented Jan. 19, 1965

3,166,272
MIXING MECHANISM
Maurice S. Liddell, Bellevue, and Lawrence M. Thien, Seattle, Wash., and Roman K. Wojciechowski, 1516 Front St., Binghamton, N.Y.; said Liddell and said Thien assignors to The Boeing Company, Seattle, Wash., a corporation of Delaware
Filed Oct. 28, 1963, Ser. No. 319,232
5 Claims. (Cl. 244—42)

This invention relates to control mechanisms and more particularly a mechanism which may receive two inputs and integrate these so as to produce an output which is a combined function thereof.

While the invention herein described was developed in relation to aircraft wing surface control systems, it is apparent that the mechanism may be employed whenever an output function is desired which is a combination of two input functions. The mixing mechanism was particularly designed to control spoilers, which are aerodynamic control surfaces designed to be raised and lowered from the top of a wing surface, located on both wings of an aircraft. The spoilers may be used as speed brakes when operated simultaneously and symmetrically, or, when operated differentially, as a lateral control system. Certain flight conditions, however, will require that both the speed brake and the lateral control functions be simultaneously used. It is therefore necessary to provide a mechanism wherein signals from the pilot wheel and speed brake lever be mixed to result in a proper controlling movement of the spoilers.

Accordingly, a primary object of this invention is to provide a spoiler control mechanism which may combine speed brake and lateral control input signals to produce a single output signal.

Another object of this invention is to provide a spoiler control mechanism through which one of the spoilers may be freely positioned subsequent to the jamming of the other spoiler in any position.

A further object of this invention is to provide a spoiler control mechanism which may be packaged in a single housing to protect against adverse environmental effects.

A still further object of this invention is to provide a spoiler control mechanism which may be packaged in a single unit at one easily accessible location in the aircraft to allow for simplicity in change of the spoiler schedule by replacement of a single cam.

Other objects and various advantages of the disclosed mixing mechanism will be apparent from the following detailed description, together with the accompanying drawings, submitted for purposes of illustration only and not intended to define the scope of the invention, reference being had for that purpose to the subjoined claims.

Briefly, the disclosed invention comprises a mixing mechanism which may be used, for example, in an aircraft, to control the movement of aerodynamic control surfaces located on the aircraft wings by input signals received from pilot operated members. The mechanism is a single unit located in the airplane fuselage and comprises two functional systems. The lateral control functional system includes an input cam which in the neutral position is symmetrical with respect to the left and right sides of the system. Two external roller cam followers, located on diametrically opposite sides of the cam, are urged against the cam surface. Mounted on a pivot pin through said rollers are two differential walking beams. One end of each of these beams, which may be called an "output end," is connected through a series of links and bell cranks to an output shaft. The output from this shaft is transmitted to the spoilers on one wing. The cam follower, links, and bell cranks positioned on opposite sides of the cam are symmetrically disposed and may be of identical length. The walking beams and rollers are pivotally connected to two links which are pivotally fixed to the control housing or fuselage on one end and the other ends of which are drawn together by resilient means so as to urge the rollers against the cam surface.

The speed brake control functional system is located forward of the lateral control functional system and within the same housing. The system includes three shafts pivotally connected to the housing, one of these being an input shaft connected to a pilot speed brake lever. A series of links fixedly mounted to the shafts and other links pivotally connecting the first mentioned links transmit the input function to an "input end" of the differential walking beam which was previously described as also a part of the lateral control functional system. While the speed brake control functional system is not structurally symmetrical, an input signal produces an equal but opposite direction motion of the "input ends" of the walking beams so as to produce a corresponding motion in the control system output shaft and thereby simultaneously and identically move the aerodynamic control surfaces.

The functional systems described above may be operated together wherein the mechanism will differentially transmit the input control signals to the output shafts.

The drawings diagrammatically illustrate by way of example, not by way of limitation, one form of the invention which comprises several novel features hereinafter set forth wherein like reference numerals designate corresponding parts in the several views in which:

FIG. 1 is an outline showing in perspective of an aircraft on which the present invention is installed, the linkage mechanism between the pilot's control wheel, pilot speed brake lever, and aircraft's spoilers on one wing being illustrated in full lines;

FIG. 2 is a diagrammatic showing of the respective positions of the components with the left hand spoiler raised and the right hand spoiler down;

FIG. 3 is a perspective showing of the mixing mechanism with the components in the same position as in FIG. 2.

The mixing mechanism is shown in FIG. 1 as used on an airplane (shown in phantom lines). The unit is contained in a housing 6 located in the fuselage of the aircraft 5. A first pilot-operated member 7 is shown mounted in the aircraft cockpit which is operatively attached to the housing 6 and the speed brake control functional system contained within the housing. A second pilot-operated member 8 is similarly connected with the mixer mechanism housing 6 for operation of the lateral control functional system. The output from the mixing mechanism is connected through cable and pulley systems to actuators 9, which control the spoilers located on the aircraft wings.

The spoiler control mechanism located in housing 6, and shown in detail in FIG. 2 is essentially composed of two functional units. Although the system is described as having two functional units or systems, it is to be realized that some of the same structural components are involved in both systems. The first is a symmetrical speed brake control system which provides means for simultaneously and identically operating the spoilers on both aircraft wings. The second functional system is the lateral control system which provides means for differentially operating the spoilers on the opposite aircraft wings.

The lateral control system is essentially symmetrical with respect to the position of the pivot points. The input from the pilot wheel, or second pilot-operated member 8, to the lateral control system is through cam 10 which is fixedly mounted on shaft 11. Two rolling cam followers 12 and 12' are disposed at diametrically opposite points and are urged against cam surface 13 by a spring or other resilient means 14. The followers 12 and 12' are mounted on pins 15 and 15'. One end of the links 16 and 16' are pivotally attached to fixed shafts 17 and 17' and the opposite ends of which are attached to the opposite ends of resilient means 14. The pins 15 and 15', on which followers 12 and 12' are mounted, pivotally connect to links 16 and 16' and to walking beams 20 and 20' near the centers thereof. One end of beams 20 and 20' are connected through pivot points 21 and 21' to links 22 and 22'. These latter two links are pivotally attached to links 23 and 23'. Links 23 and 23' are portions of the two links 24 and 24', which are mounted on shafts 17 and 17', the other end of links 24 and 24' are attached to, and are part of, the speed brake control functional system which will be described later. The opposite ends of the aforementioned links 20 and 20' are pivotally connected to links 25 and 25' through pivot pins 18 and 18'. The outboard portions of links 25 and 25' are pivotally connected to bell cranks 26 and 26' which are pivotally mounted on fixed shafts 27 and 27'. The opposite ends of bell cranks 26 and 26' are pivotally connected to links 28 and 28' which in turn have their opposite ends attached to links 29 and 29' fixedly mounted on output shafts 30 and 30'. As shown in FIG. 3, located outside of housing 16 are links 31 and 31' fixedly mounted on shafts 30 and 30', respectively, and the ends of which are connected to the cable and pulley systems for operation of actuators 9.

Operation of the lateral control functional system, just described, will provide a differential movement of the spoilers, i.e. the spoiler on one wing will rise while the other spoiler remains down or is raised to a lesser height. For example, to execute a banking left turn which involves raising the left spoiler while the right spoiler remains down, the cam 10 rotates clockwise (as viewed in FIG. 2) causing the follower 12 to move along cam surface 13 until it is displaced toward the center of the cam, i.e. the follower engages the portion of the cam with the smaller radius. Simultaneously, follower 12' moves onto the larger radius portion of cam 10, thus moving this follower away from the cam center. Since followers on rollers 12 and 12' are connected through pins 15 and 15' to links 16 and 16', the rollers will swing about shafts 17 and 17' and thus move along the radius 17-15 and 17'-15'. This movement of rollers 12 and 12' also causes links 20 and 20' to pivot about pins 21 and 21'. This motion causes link 25 on the right side of the system (as viewed in FIG. 2) to move toward the cam 10 and link 25' on the left side to move away from the cam. The motion through links 26, 28 and 29 may be easily followed resulting in the shaft 30 and link 31 rotating counter-clockwise (as viewed in FIG. 2). This movement causes the spoiler on the right wing to move down or remain down. It is apparent that any further clockwise rotation of cam 10 will keep the right wing spoiler down. The movement of link 25', on the other hand, causes the links 26', 28' and 29' to move opposite to the above described right side of the lateral control system but this will also result in a counter-clockwise rotation of shaft 30' and link 31', which, however, raises the left wing spoilers. Thus, it will be seen that clockwise rotation of cam 10 will cause the left wing spoiler to rise and the right wing spoiler to remain down with the concomitant sustaining lift on the right wing and additional drag but decreasing lift on the left wing which aids in banking to the left. It also is obvious that counter-clockwise rotation of cam 10 with corresponding opposite movements of the links on the two sides of the lateral control mechanism will cause banking to the right.

As seen in FIG. 2, the speed brake control system is mounted forward of the cam 10. The input from the pilot speed brake lever may be provided through shaft 17, 17' or 32. As was previously pointed out, link 24' is mounted near its center on shaft 17' and while the aft portion of link 24' pivotally connects the speed brake control system to the lateral control system, the forward portion, 33' is pivotally connected to link 34'. Link 34' pivotally connects to link 35, at its forward end, which is mounted on shaft 32. The aft end of link 35 is pivotally attached to link 34 which in turn is also pivotally connected to link 33. Link 33 is the forward portion of link 24, and the latter link serves as the connection between the speed brake control system and the lateral control system.

Operation of the speed brake control system provides simultaneous and identical movement of the spoilers on both wings of the aircraft. For purposes of description input from the pilot speed brake control lever 7 is assumed to be provided through shaft 17'. Rotation of this shaft in a counter-clockwise direction (as viewed in FIG. 2) will cause link 22' to move to the right causing link 20' to rotate about pivot pin 15' and thereby cause link 25' to move away from cam 10. This motion is transmitted through the bell crank 26' and adjoining links 28' and 29' resulting in a counter-clockwise rotation of shaft 30' and link 31' which will raise the left hand spoiler. Rotation of shaft 17' also produces movement of links 33', 34', 35, 34 and 33 so as to result in a movement of link 22 to the left. As the remainder of the links and pivot pins are symmetrical with the left side of the system movement will occur on the right side of the system resulting in clockwise rotation of shaft 30 and link 31 so as to raise the right hand spoiler. It is to be appreciated that since all of the links aft of the fixed shafts 17 and 17' may be of equal size, the rise in the spoilers on both wings may be made identical.

Flight conditions will often dictate that lateral control through the spoilers must be provided while the speed brakes are in operation. Operation of the entire system will be described for a turn while the aircraft is slowing down. Mixing of the two control functions is essentially accomplished by the links 16, 20, 22 and 23 and their symmetrical counterparts, and by cam followers 12 and 12'. With both spoilers in a raised position, a lateral control input through cam 10 will cause one of the rollers 12 or 12' to move toward the cam center while the other moves away therefrom. This displacement of the followers will have the same effect for the follower which moves away from the cam 10 as if the initial spoilers were down, i.e. the spoiler will be raised further. However, the opposite spoiler will be able to move down since its position at the initiation of the lateral control operation was raised and movement of the follower will be reflected in the spoiler, unlike the situation where both spoilers were down initially at the beginning of the control operation.

The construction of the control system is also significant from a safety point of view. Jamming of the spoilers on one wing during differential operation will obviously cause subsequent difficulty after the flight manuever is completed. However, the present system allows the pilot to freely position the unjammed spoilers on the opposite wing. For example, suppose that the right wing spoilers or the linkage in the right side of the mixer mechanism jams while the left wing spoilers are in a raised position, as shown in FIGS. 2 and 3. It is seen that pin 18 becomes a fixed point about which walking beam 20 and the follower 12 will pivot if the cam 10 is rotated. However, the resilient means 14 and the link 16, to which the follower 12 is connected through the pin 15, will continue to keep the follower in contact with the cam surface 13. Therefore, if the cam 10 is rotated counter-clockwise (as viewed in FIG. 2) the roller 12 will move to the right causing the link 22 to move in the same direction and this movement will be transmited through the speed brake system. The resulting movement of link 22' to the left will move link 25' to the right and will lower the spoilers on the left wing. Of course, the left hand spoiler may be positioned anywhere from its original full raised position to the down position, the latter making the left and right wing spoilers symmetrically positioned in this example. The system operation works similarly, if one side of the mechanism is jammed in the raised position. Additionally if the jammed spoilers are not fully raised, the opposite wing spoilers may not only be symmetrically positioned, but may also be raised to a higher position than the jammed spoilers. It is apparent therefore, that the pilot maintains substantial control solely through the pilot-operated member 8 which operates the lateral control system, notwithstanding that the spoilers on one wing are jammed.

It will also be appreciated that the height to which the spoilers may be raised, as well as the rate, may be easily varied or rescheduled by simply replacing the single cam 10 in the mixing mechanism.

While only one method and one embodiment of carrying out the method of the invention have been shown in the accompanying drawings, it will be evident that various other modifications are possible in the arrangement and construction of the disclosed mixing mechanism without departing from the scope of the invention.

We claim:

1. In a pilot operated aircraft having wings and a fuselage:
   (a) a plurality of movable aerodynamic control surfaces mounted on said wings, at least one control surface mounted on each wing,
   (b) a control unit for said control surfaces comprising
      (1) a pivotable cam linked to a pilot operated member,
      (2) a pair of cam followers resiliently urged against said cam,
      (3) linkages operatively interconnecting said cam followers to said control surfaces,
      (4) means for equally and oppositely displacing said linkages relative to said cam independent of the position of said cam, said means being selectively responsive to a second pilot operated member, whereby displacement of said linkage by said displacing means moves said control surfaces together and equally, and displacement of said followers by said cam moves said control surfaces on opposite wings differentially relative to the position of said control surfaces produced by said displacing means.

2. The control unit of claim 1 in which the means for equally and oppositely displacing the linkages comprises:
   (a) three shafts, one of said shafts being operatively connected to said second pilot operated member and pivotally mounted on said fuselage, the two other shafts being rotatably mounted on the fuselage of said aircraft in spaced relationship with respect to said one shaft,
   (b) three first links, both of said rotatably mounted shafts having one of said first links pivotally mounted thereon and the pivotally mounted shaft having the remaining said first link fixedly mounted thereon,
   (c) a pair of second links, one of said second links pivotally interconnecting one end of a first of said first links with one end of a second of said first links and the other of said second links pivotally interconnecting the opposite end of said first of said first links with one end of a third of said first links, and
   (d) a pair of third links pivotally interconnecting the other end of each of said second and said third of said first links with said linkages operatively connecting said cam followers to said control surfaces.

3. In a pilot operated aircraft having a fuselage, wings and movable control surfaces mounted on said wings, at least one movable control surface mounted on each wing, a control surface mixing mechanism including in combination:
   (a) means for moving said movable control surfaces together and symmetrically including,
      (1) a first pilot-operated member,
      (2) three shafts, one of said shafts being an input shaft and pivotally mounted on the fuselage of said aircraft and operatively connected to said first pilot-operated member, the two other shafts being pivotally mounted on the fuselage of said aircraft in spaced relationship with respect to said input shaft,
      (3) three first links, each of said three shafts having one of said first links fixedly mounted thereon,
      (4) a pair of second links, one of said second links pivotally interconnecting one end of a first of said first links with one end of a second of said first links and the other of said second links pivotally interconnecting the opposite end of said first of said first links with one end of a third of said first links, and
      (5) a pair of third links pivotally interconnecting the other end of each of said second and said third of said first links with a means for moving the movable control surfaces on opposite wings differentially, whereby a control signal transmitted through said input shaft will cause an equal movement of said third links in opposite directions; and
   (b) said means for moving the movable control surfaces mounted on opposite wings differentially including a second pilot-operated member.

4. In a pilot-operated aircraft having a fuselage, wings and movable control surfaces mounted on said wings, at least one control surface mounted on each wing, a mixer mechanism including in combination:
   (a) means for moving said movable control surfaces together and symmetrically including a first pilot-operated member; and
   (b) means for moving said movable control surfaces on opposite wings differentially including,
      (1) a second pilot-operated member,
      (2) an input shaft pivotally mounted on the fuselage of said aircraft and operatively connected to said second pilot-operated member,
      (3) a cam mounted on said input shaft,
      (4) a pair of links pivotally secured in spaced relationship at one end, the other end of said links being connected by resilient means,
      (5) a pair of walking beams pivotally secured at one end to said means for moving said movable control surfaces together and symmetrically,
      (6) a pair of pins, one of said pins pivotally interconnecting one of said links with one of said walking beams and the other of said pins pivotally interconnecting the other of said links with the other of said walking beams,
      (7) a pair of external cam followers, each of said pair of pins having one of said followers rotatably mounted thereon, said followers being urged against the cam through the resilient means interconnecting the pair of links, and
      (8) a pair of linkages, one of said linkages pivotally interconnecting the other end of one said walking beams with the movable control surfaces on one of said wings and the other of said linkages pivotally interconnecting the other end of the other of said walking beams with the movable control surfaces on the other of said wings whereby rotation of the cam through an input signal transmitted from the second pilot-operated member causes a differential movement between the movable control surfaces on the opposite wings.

5. The combination comprising:
   (a) first means for rotating a pair of output shafts equally and in identical directions including,
      (1) a pivotally mounted first input shaft having a cam fixedly mounted thereon,
      (2) a pair of links pivotally secured at one end in spaced relationship, the other end of said links being connected by resilient means, (3) a pair of walking beams pivotally secured at one end to third means for rotating said pair of output shafts equally and in opposite directions,
(4) a pair of pins, one of said pins pivotally interconnecting one of said links with one of said walking beams and the other of said pins pivotally interconnecting the other of said links with the other of said walking beams,
(5) a pair of external cam followers, each of said pair of pins having one of said followers rotatably mounted thereon, said followers being urged against the cam through the resilient means interconnecting the pair of links;

(b) second means comprising a pair of linkages, one of said linkages pivotally interconnecting the other end of one of said walking beams with one of said pair of output shafts and the other of said linkages pivotally interconnecting the other end of the other of said walking beams with the other of said pair of output shafts, whereby rotation of said first input shaft causes equal and identical rotation of said pair of output shafts; and (c) said third means for rotating said pair of output shafts equally and in opposite directions including,
(1) three shafts, one of said shafts being a pivotally mounted second input shaft and the other two shafts being pivotally mounted in spaced relationship with respect to said second input shaft,
(2) three first links, each of said three shafts having one of said first links fixedly mounted thereon,
(3) a pair of second links one of said second links pivotally interconnecting one end of a first of said first links with one end of a second of said first links and the other of said second links pivotally interconnecting the opposite end of said first of said first links with one end of a third of said first links, and
(4) a pair of links pivotally interconnecting the the other end of each of said second and said third of said first links with said first means, whereby a rotation of said second input shaft causes equal and opposite rotation of said pair of output shafts.

References Cited by the Examiner
UNITED STATES PATENTS

| | | | |
|---|---|---|---|
| 2,275,692 | 3/42 | Sims. | |
| 2,402,118 | 6/46 | Ashkenas | 244—42 X |
| 2,685,422 | 8/54 | Hammond et al. | 244—83 |
| 2,940,696 | 6/60 | Teague | 244—83 |
| 2,959,066 | 11/60 | Bailey et al. | 74—469 |
| 3,070,334 | 12/62 | Ebdon | 244—90 |

FOREIGN PATENTS

| | | |
|---|---|---|
| 111,108 | 7/44 | Sweden. |
| 272,455 | 12/27 | Great Britain. |

MILTON BUCHLER, *Primary Examiner.*